United States Patent [19]

Saito et al.

[11] Patent Number: 5,184,229
[45] Date of Patent: Feb. 2, 1993

[54] COMPRESSION CODING DEVICE AND EXPANSION DECODING DEVICE FOR PICTURE SIGNAL

[75] Inventors: Osamu Saito; Kenji Ito; Kenji Moronaga; Mikio Watanabe, all of Tokyo, Japan

[73] Assignee: Fuji Photo Film Co., Ltd., Kanagawa, Japan

[21] Appl. No.: 444,701

[22] Filed: Dec. 1, 1989

[30] Foreign Application Priority Data

Dec. 9, 1988 [JP] Japan .................................. 63-309870
Mar. 31, 1989 [JP] Japan .................................... 1-78288

[51] Int. Cl.⁵ .............................................. H04N 1/41
[52] U.S. Cl. .................................... 358/427; 358/432; 358/261.3
[58] Field of Search ............ 358/432, 433, 426, 261.3, 358/427, 434; 341/52, 55, 63, 65; 382/56

[56] References Cited

U.S. PATENT DOCUMENTS 4,071,855  1/1978  Wilmer ................................. 358/433
4,780,761 10/1988  Daly et al. ........................... 358/138
4,982,282  1/1991  Saito et al. .......................... 358/909

Primary Examiner—Jin F. Ng
Assistant Examiner—Dov Popovici

[57] ABSTRACT

A device for coding a picture signal by compression produces, when detected that the amplitude of data which has undergone two-dimensional orthogonal transform and then normalized has overflown, data specifying the normalized data in addition to coded data of the normalized data. A decoding device, therefore, is capable of accurately decoding original picture data despite the overflow. When a block of picture data lies in a predetermined range which occurs with relatively low probability, the picture data is transformed into coded data which includes a predetermined code. When the block of picture data does not lie in such a range, the picture data is converted into Huffman-coded data. This reduces the required capacity of a look-up table for coding.

17 Claims, 16 Drawing Sheets

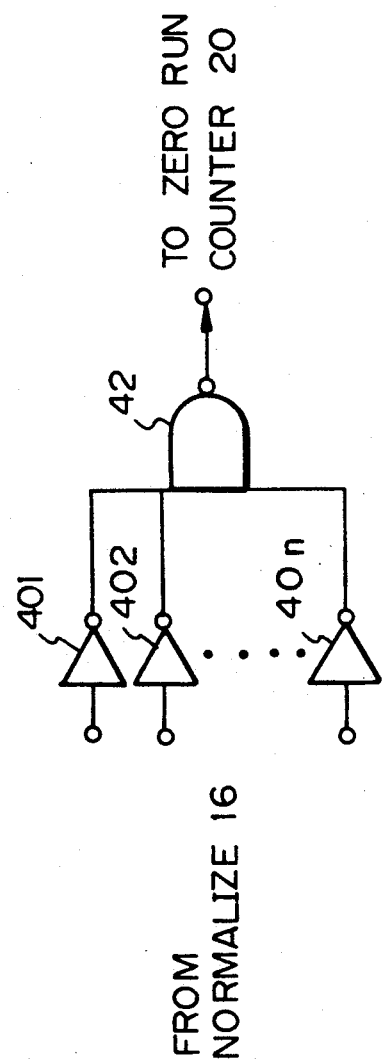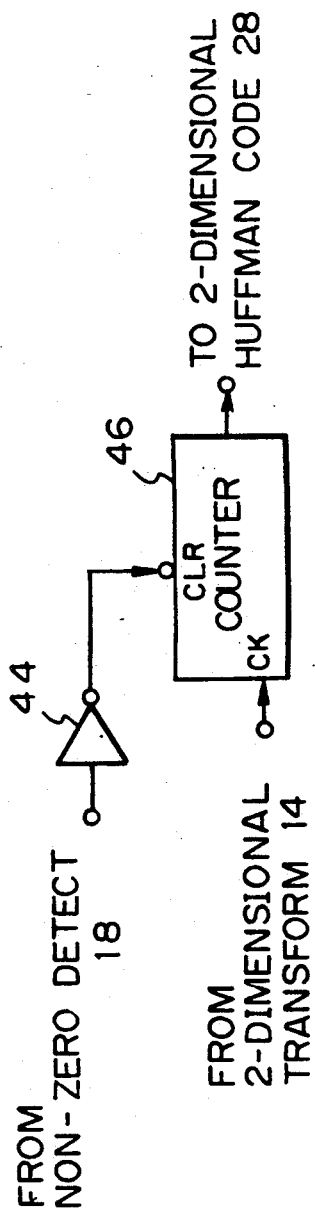

Fig. 14

| AMPLITUDE OF TRANSFORM COEFFICIENT | AMPLITUDE RANGE | EXTRA BIT |
|---|---|---|
| −1, 1 | 0 0 1 | 1 |
| −3, −2, 2, 3 | 0 1 0 | 2 |
| −7 ~ −4, 4 ~ 7 | 0 1 1 | 3 |
| −15 ~ −8, 8 ~ 15 | 1 0 0 | 4 |
| −31 ~ −16, 16 ~ 31 | 1 0 1 | 5 |
| −63 ~ −32, 32 ~ 63 | 1 1 0 | 6 |
| −127 ~ −64, 64 ~ 127 | 1 1 1 | 7 |
| −32767 ~ −128, 128 ~ 32767 | 0 0 0 | 16 |

Fig. 15

| OF | LOWER 7 BITS MSB            LSB | AMPLITUDE RANGE |
|---|---|---|
| 0 | 1 X X X X X X | 1 1 1 |
| 0 | 0 1 X X X X X | 1 1 0 |
| 0 | 0 0 1 X X X X | 1 0 1 |
| 0 | 0 0 0 1 X X X | 1 0 0 |
| 0 | 0 0 0 0 1 X X | 0 1 1 |
| 0 | 0 0 0 0 0 1 X | 0 1 0 |
| 0 | 0 0 0 0 0 0 1 | 0 0 1 |
| 1 | X X X X X X X | 0 0 0 |

Fig. 16

OUTPUT INCLUDING SHIFT CODE

| SHIFT CODE | DC DIFFERENCE (8 BITS) |

Fig. 17

DC CODE OUTPUT

| HUFFMAN CODE | HUFFMAN CODE | SHIFT CODE | LOWER 8 BITS OF DIFFERENCE | HUFFMAN CODE |

|← 25 →|← 7 →|← 131 →|← 16 →|

| ZERO RUN-LENGTH (6 BITS) | NON-ZERO AMPLITUDE (3 BITS) |

Fig. 21B
SHIFT CODE

| 1 | 0 | 0 | 0 |
|---|---|---|---|
| | DCT COEFFICIENT UPPER 4 BITS | | |

Fig. 22
OUTPUT INCLUDING SHIFT CODE

| SHIFT CODE | RUN-LENGTH 6 BITS | DCT COEFFICIENT LOWER 12 BITS |
|---|---|---|

Fig. 23
AC CODE OUTPUT

| HUFFMAN CODE | SHIFT CODE | RUN-LENGTH 6 BITS | DCT COEFFICIENT LOWER 12 BITS | HUFFMAN CODE |
|---|---|---|---|---|
| AMPLITUDE RANGE 2 | AMPLITUDE RANGE 7 | | | AMPLITUDE RANGE 5 |
| RUN-LENGTH 7 | RUN-LENGTH 33 | | | RUN-LENGTH 1 |

COMPRESSION CODING DEVICE AND EXPANSION DECODING DEVICE FOR PICTURE SIGNAL

BACKGROUND OF THE INVENTION

1. Field of the Invention

The present invention relates to a device for coding a picture signal by compression and a device for decoding a compressed picture signal by expansion. More particularly, the present invention is concerned with a picture signal compression coding device for eliminates the overflow of data which has undergone two-dimensional orthogonal transform in the event of coding, a compression coding device capable of reducing the amount of data to be stored in a Huffman coding table, and a decoding device for decoding data coded by such a coding device.

2. Description of the Related Art

Digital picture data representative of a picture picked up by an electronic still camera, for example, are stored in a memory. Various kinds of compression coding schemes have been proposed to reduce the amount of such digital picture data and thereby the required memory capacity. Among the compression coding schemes, a two-dimensional orthogonal transform coding scheme is extensively used because data is coded by a large compression ratio and because a minimum of picture distortions particular to coding occurs.

Two-dimensional orthogonal transform coding is such that picture data representative of a single picture are divided into a plurality of blocks, and the picture data are subjected to two-dimensional orthogonal transform block by block. A difference between a DC component included in the transformed data and DC component data immediately preceding it, for example, is produced and then subjected to Huffman coding. On the other hand, those portions of the picture data which have undergone orthogonal transform, i.e., the AC component of transform coefficients lower than a predetermined threshold are discarded, and then the remaining data are quantized by a predetermined step size, or normalized. By this kind of procedure, the values of transform coefficients, i.e., the dynamic range of amplitudes is suppressed.

The transform coefficients normalized as stated above are coded. Transform coefficient data are sequentially arranged in order of frequency, i.e., from low frequency components to high frequency components in matching relation to the size of picture data block. Since the transform coefficient data becomes zero more often in the higher frequency range than in the lower frequency range, run-length coding is executed to transform the data into a run-length of zeros and an amplitude of values other than zero, i.e., non-zeros. The data subjected to run-length coding is two-dimensionally Huffman-coded to produce compressed picture data.

In the two-dimensional orthogonal transform coding procedure stated above, the normalizing coefficient may be varied to change the compression ratio of picture data. For example, when a large normalizing coefficient is selected, transform coefficients are divided by the large normalizing coefficient resulting in small transform coefficient data and, therefore, in a large compression ratio. A large compression ratio degrades the quality of data, as well known in the art. Conversely, a relatively small normalizing coefficient desirably reduces the picture data compression ratio and thereby enhances the quality of data. However, a problem with a small normalizing coefficient is that transform coefficients divided thereby have large values to cause data to overflow during the subsequent run-length coding and Huffman coding. Coding the data while neglecting overflown data would prevent data having accurate values from being reproduced in the event of decoding.

A prerequisite with two-dimensional Huffman coding is that coded data to be produced by Huffman coding be stored as a look-up table beforehand in association with all the possible values of both of the differences of the DC component data and the AC component data which has undergone run-length coding. Taking account of the frequency of occurrence of the differences of the DC component data and the AC component data which has undergone run-length coding, the look-up table is loaded with data for coding such that short coded data and long coded data may be produced in response to values having high frequency of occurrence and values having low frequency of occurrence, respectively. More specifically, the look-up table stores long coded data for those values which occur with low frequency and are rarely used. This results in the need for a look-up table having a considerable capacity.

SUMMARY OF THE INVENTION

It is therefore an object of the present invention to provide a compression-coding device and an expansion-decoding device for a picture signal which prevent transform coefficients which have undergone orthogonal transform from overflowing and thereby decode compression-coded data with accuracy.

It is another object of the present invention to provide an image signal compression-coding device which reduces the required capacity of a look-up table for Huffman coding, and an expansion-decoding device for decoding coded data outputted by the coding device.

In accordance with the present invention, a device for coding a picture signal by dividing digital picture data which constitutes a single picture into a plurality of blocks and compressing the picture data block by block comprises a coding section for coding each of the plurality of blocks of digital picture data, a region data detecting section for detecting that the individual blocks of digital picture data lie in a predetermined range, and an output data producing section for producing output data which includes the coded data. The output data producing section outputs, depending on whether or not the digital picture data lies in the predetermined range, data specifying the digital picture data in addition to the coded data produced by the coding section.

Also, in accordance with the present invention, a device for decoding a picture signal by expanding compression-coded digital picture data representative of a single picture by two-dimensional inverse orthogonal transform comprises a decoding section for decoding the picture data, a data selecting section for selecting at least one of the decoded data produced by the decoding section and the picture data, an inverse normalizing section for inversely normalizing the data selected by the data selecting section, an inverse orthogonal transforming section for applying two-dimensional inverse orthogonal transform to the inversely normalized data by the inverse normalizing section, and an overflow detecting section for detecting, in response to the decoded data produced by the decoding section, that the picture data has an amplitude which exceeds a predetermined range. The data selecting section selects, when the overflow detecting section detects that the amplitude of the picture data exceeds the predetermined range, the picture data in addition to the decoded data produced by the decoding section.

Further, in accordance with the present invention, a device for decoding a picture signal by expanding compression-coded digital picture data representative of a single picture comprises a Huffman coding section for Huffman coding the picture data, a code detecting section for detecting a predetermined code when the picture data includes the predetermined code, and a code decoding section for decoding the picture data which includes the predetermined code. The code detecting section causes, when detected the predetermined code in the picture data, the code decoding section to decode and, when not detected the predetermined code, causes the Huffman decoding section to decode.

BRIEF DESCRIPTION OF THE DRAWINGS

The objects and features of the present invention will become more apparent from the consideration of the following detailed description taken in conjunction with the accompanying drawings in which:

FIG. 2 is a block diagram schematically showing a specific construction of a non-zero detecting section included in the device of FIG. 1;

FIG. 3 is a block diagram schematically showing a specific construction of a zero run counter also included in the device of FIG. 1;

FIG. 14 is a table representative of a relationship between the amplitudes of transform coefficients and the amplitude ranges and extra bits;

FIG. 15 shows a relationship between the amplitudes of transform coefficients and the amplitude ranges;

FIG. 16 shows a specific format of DC component data including a shift code and outputted by the device of FIG. 8;

FIG. 17 shows a specific format of DC component data outputted by the device of FIG. 8;

FIG. 21B shows a specific format of a shift code which is generated by a shift code generating section of FIG. 8;

FIG. 22 shows a specific format of AC component data including a shift code which is generated by the device of FIG. 8;

FIG. 23 is a plot representative of an example of AC component data outputted by the device of FIG. 8;

DESCRIPTION OF THE PREFERRED EMBODIMENTS

Figure 1:
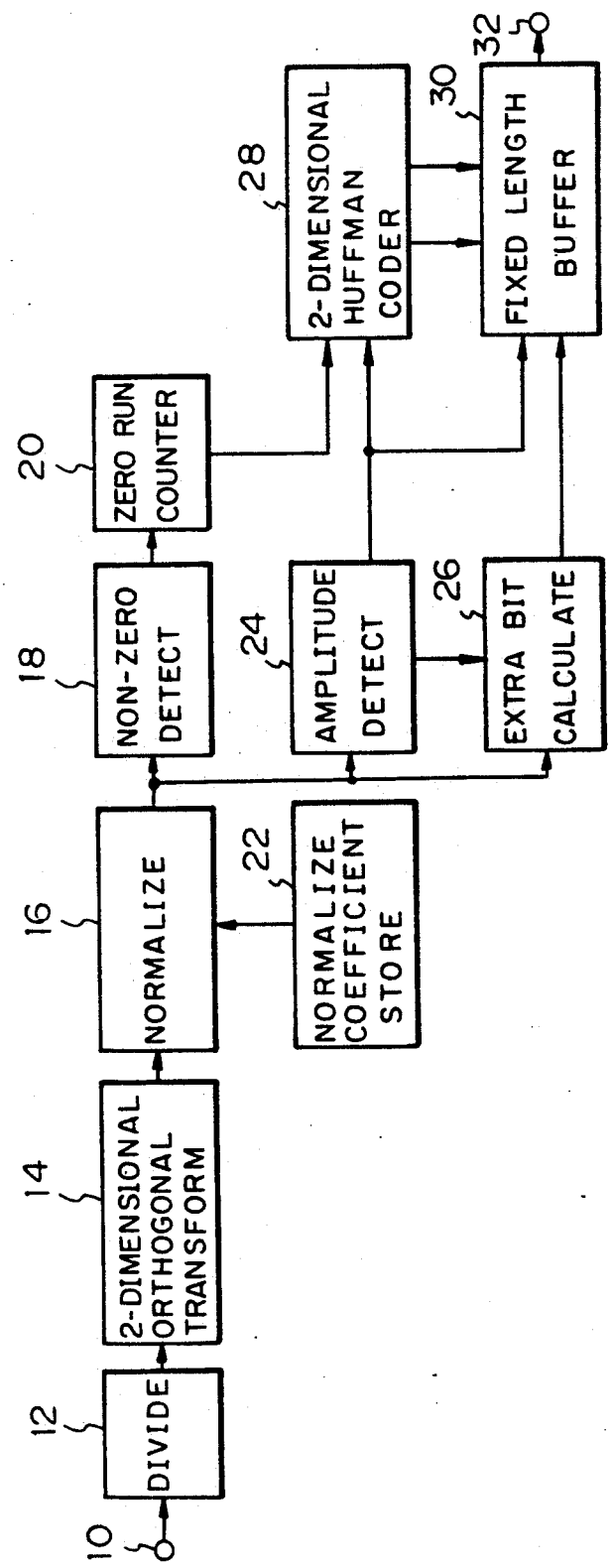
FIG. 1 is a schematic block diagram showing an image signal compression-coding device embodying the present invention.

Referring to FIG. 1 of the drawings, a compression coding device embodying the present invention is shown and includes a dividing section 12 which is implemented by a frame buffer. One frame of still picture data picked up by an electronic still camera, for example, is applied to and stored in the dividing section 12 via an input terminal 10. The dividing section 12 divides the one frame of picture data into a plurality of blocks and delivers them block by block to a two-dimensional orthogonal transforming section 14. The orthogonal transforming section 14 transforms the picture data block by block by discrete cosine transform, Hadamard transform or a similar two dimensional orthogonal transform known in the art.

Figure 10:
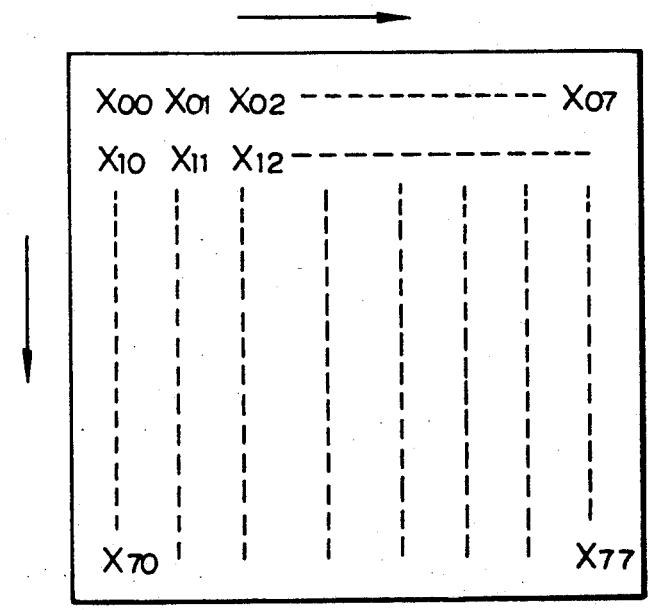
FIG. 10 shows an example of data which has undergone two-dimensional orthogonal transform.

Each block of picture data which has undergone two-dimensional orthogonal transform as stated above is arranged in rows and columns, as shown in FIG. 10. In FIG. 10, the order of data sequentially increases from the top left in directions indicated by arrows. The output of the orthogonal transforming section 14 is fed to a normalizing section 16.

The normalizing section 16 compares the transformed picture data, i.e., transform coefficients from the orthogonal transforming section 14 with a predetermined threshold value so as to discard those coefficients which are smaller than the threshold value. The transform coefficients other than the discarded ones are divided by a predetermined quantizing step size, or normalizing coefficient $\alpha$, and thereby quantized by the normalizing coefficient $\alpha$. More specifically, the normalizing section 16 selects a particular normalizing coefficient α out of a normalizing coefficient storing section 22. Dividing the transform coefficients other than the discarded coefficients by a single normalizing coefficient α as mentioned above is only illustrative. Alternatively, the normalizing coefficient α may be used in combination with a weight table T shown in FIG. 12. In the weight table T of FIG. 12, smaller values are assigned to lower frequency components while larger values are assigned to higher frequency components, because transform coefficients lying in the lower frequency range are more important as data. The data shown in the weight table T are individually multiplied by the normalizing coefficient α, and then the transform coefficients other than the discarded coefficients are divided by the individual products α·T and thereby normalized. Assuming that a transform coefficient before the normalization is X, then the normalized transform coefficient X' is produced by:

$$X' = X/(\alpha \cdot T)$$

More specifically, the lower frequency and higher frequency data of the table T are respectively associated with the lower frequency and higher frequency components of the transform coefficients X. Each transform coefficient X is divided by the product of its associated table data and normalizing coefficient α. The use of such a weight table T is advantageous over the simple division-by-α scheme because it divides the lower frequency components by smaller values and higher frequency components by larger values, i.e., provides the latter with a smaller compression ratio and a larger compression ratio, respectively. Especially, a normalizing coefficient α available with high picture quality mode compression is inherently small. In such a mode, therefore, assigning larger values to the lower frequency components of the weight table T and smaller values to the lower frequency components is successful in reducing overflow which usually concentrates on lower frequency components.

Figure 13:
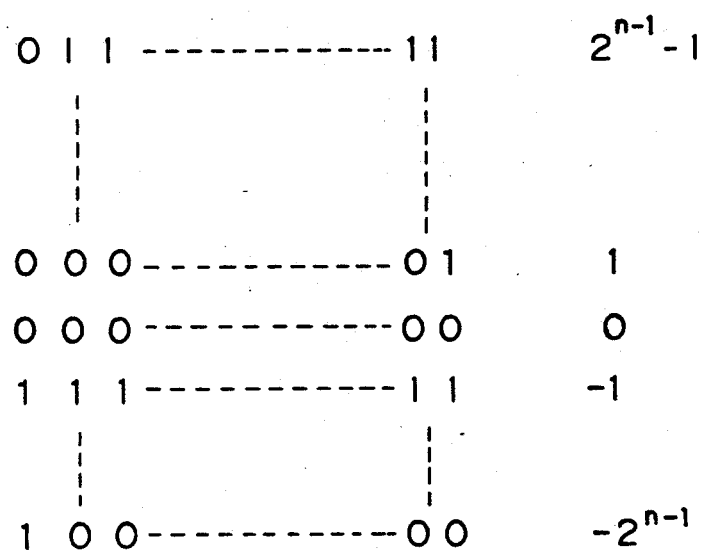
FIG. 13 shows an example of normalized transform coefficients.

The output of the normalizing section 16 is delivered as normalized transform coefficients each being represented by n bits, as shown in FIG. 13. In FIG. 13, the transform coefficients have values lying in the range of $2^{n-1} - 1$ to $-2^{n-1} - 1$ as represented by n-bit data. Specifically, in the example shown in FIG. 13, one half of the data, i.e., $n-1$ bits of data render positive data of $2^{n-1} - 1$ to 1 and 0 while the other half or $n-1$ bits of data render negative data of $-1$ to $-2^{n-1}$. Among the negative data, $-1$ to $-(2^{n-1} - 1)$ constitute respectively 2's complements in relation to the positive data of 1 to $2^{n-1} - 1$.

Figure 11:
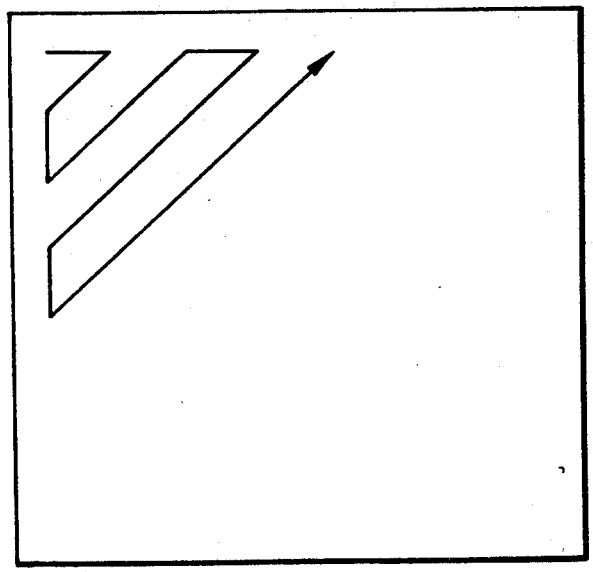
FIG. 11 shows how run-lengths and amplitudes of non-zeros are coded.

The normalized transform coefficients are arranged in a block by each n bits in the same manner as the data which have not been normalized, as illustrated in FIG. 11. The block of normalized transform coefficients are sequentially scanned and read out in a zig-zag fashion, the lowest frequency component being first. The output of the normalizing section 16 is routed to a non-zero detecting section 18 and an extra bit calculating section 26.

FIG. 2 shows a specific construction of the non-zero detecting section 18. In the figure, the non-zero detecting section 18 has n inverters $40_1, 40_2, \ldots, 40_n$ to which n bits of transform coefficient data are applied. The outputs of the inverters $40_1, 40_2, \ldots, 40_n$ are connected to a NAND gate 42. Specifically, the n bits of transform coefficient data are applied to the n inverters $40_1, 40_2, \ldots, 40_n$ in the form of (logical) ONEs and (logical) ZEROs. If any of the transform coefficient data is a ONE, the inverter associated with that data will produce a ZERO and, hence, the output of the NAND gate 42 will be a ONE with no regard to the outputs of the other inverters. The ONE appearing on the output of the NAND gate 42 indicates that the n-bit transform coefficient data is not zero. Conversely, when all the n bits of transform coefficient data are ZEROs, the outputs of the inverters $40_1, 40_2, \ldots, 40_n$ will be ONEs without exception resulting in the output of the NAND gate 42 being a ZERO. This ZERO shows that the n-bit transform coefficient data is zero. The output of the non-zero detecting section 18 is fed to a zero run-length counter 20.

FIG. 3 indicates a specific construction of the zero run-length counter 20. As shown, the zero run-length counter 20 includes an inverter 44 and a 6-bit counter 46 having a clear terminal CLR and a clock terminal CK. The zero or non-zero outputted by the non-ZERO detecting section 18 as stated above is applied to the inverter 44. The inverted output of the inverter 44 is fed to the clear terminal CLR of the counter 46. When a non-zero signal or ONE is fed from the non-zero detecting section 18 to the inverter 44, the inverter 44 applies a ZERO to the clear terminal CLR of the counter 46 to thereby clear the counter 46. The counter 46 counts transform coefficient transfer check clock pulses which are delivered from the orthogonal transforming section 14 to the clock terminal CK. Since the counter 46 is cleared by a ZERO input to the clear terminal CLR as mentioned above, it continuously counts the input clock so long as the non-zero detecting section 18 produces a zero signal or ZERO, thereby counting the run-lengths of zeros which occur during the zig-zag scanning shown in FIG. 11.

In the illustrative embodiment, since each data block has a size of $8 \times 8 = 64$ as stated previously, the maximum number of zeros which may appear continuously is sixty-four and, hence, the run-length of zeros can be represented by 6-bit data. The output of the zero run-length counter 20 is fed to a two-dimensional Huffman coding section 28.

Figure 4A:
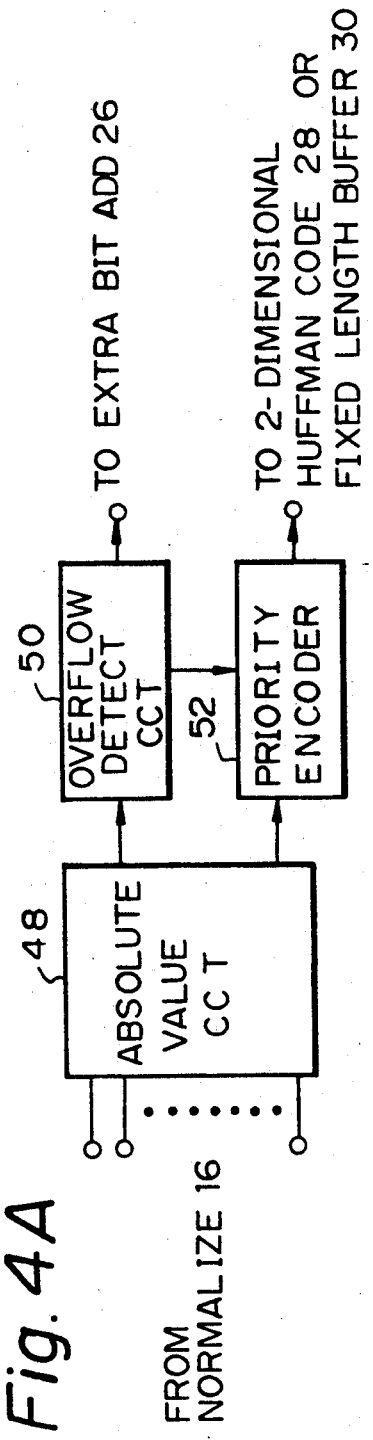
FIG. 4A is a block diagram schematically showing a specific construction of an amplitude detecting section of the device shown in FIG. 1.

The normalized transform coefficients from the normalizing section 16 are also routed to an amplitude detecting section 24 which produces amplitude range bits and an overflow signal as will be described later in detail. As shown in FIG. 4A specifically, the amplitude detecting section 24 has an absolute value circuit 48 to which the normalized n bits of transform coefficients are fed from the normalizing section 16. In response, the absolute value circuit 48 produces the absolute values of the inputs. Specifically, when the input n-bit data is any one of positive data of $2^{n-1} - 1$ to 1 and 0 as shown in FIG. 13, the absolute value circuit 48 feeds it out without any processing. When the input n-bit data is any one of negative data of $-1$ to $-2^{n-1}$, the absolute value circuit 48 inverts the symbol on a 2's complement basis and thereby outputs the absolute value of the data.

Figure 4B:
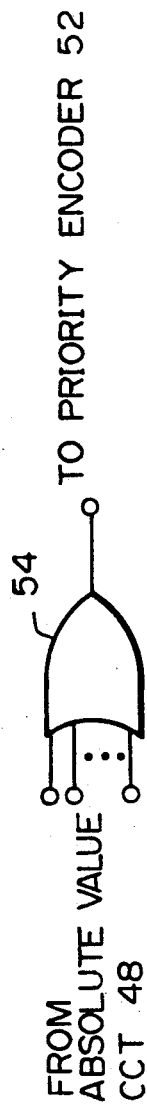
FIG. 4B is a block diagram schematically showing a specific construction of an overflow detecting circuit included in the arrangement of FIG. 4A.

Among the n bits of data fed out from the absolute value circuit 48, upper $n-8$ bits are applied to an overflow detecting circuit 50. As shown in FIG. 4B, the overflow detecting circuit 50 has an OR gate 54 to which the upper $n-8$ bits from the absolute value circuit 48 are applied. When any of the $n-8$ inputs is a ONE, the OR gate 54 produces an overflow signal or ONE. In the illustrative embodiment, as shown in FIG.

14, compressed data are sent out for the 8-bit data the transform coefficient levels of which belong to the range of −127 to 127. However, for the other data which exceed the range of −127 to 127 and, therefore, involve overflows, extra data are added to the compressed data before the latter is sent out. In the event of overflow, i.e., when the upper n−8 bit data include a ONE, the overflow detecting circuit 50 produces a ONE or an overflow signal. The output of the overflow detecting circuit 50 is coupled to a priority encoder 52 and the extra bits calculating section 26, as illustrated in FIG. 1.

Among the n-bit output of the absolute value circuit 48, the lower seven bits are applied to the priority encoder 52. Since the transform coefficients have already been converted by the absolute value circuit 48 into data representative of their absolute values, the absolute value data can be represented by seven bits which lie in the previously mentioned range of −127 to 127 and, originally, are n-bit data with symbol identification being excluded. Hence, for the data lying in such a range, use is made of the lower seven bits out of the n-bit output of the absolute value circuit 48. As shown in FIG. 15, the priority encoder 52 produces 3-bit data representative of an amplitude range in response to an output OF of the overflow detecting circuit 50 and the lower 7-bit data from the absolute value circuit 48.

As shown in FIG. 15, when the output of the overflow detecting circuit 50, i.e., the overflow signal is a ZERO, a transform coefficient is represented by the lower seven bits and, hence, three bits of amplitude range data are outputted in association with the lower seven bits. The amplitude range data are set in matching relation to the ranges of the lower 7-bit data of transform coefficients, as tabulated in FIG. 14. In FIG. 15, the crosses included in the lower seven bits indicate that those bits may be either one of a ONE and a ZERO. When the overflow signal is a ONE, i.e., when data exceeding the lower eight bits are present, 3-bit amplitude range data which is "000" is outputted to indicate the overflow, as shown in FIG. 15.

In this particular embodiment, a 3-bit amplitude range is assigned to each range of amplitudes, as listed in FIG. 14. For example, when the amplitude is −1 or 1, the 3-bit amplitude range will be "001"; when the former lies in the range of −127 to −64 or the range of 64 to 127, the latter will be "111". It is to be noted that the extra bits shown in FIG. 14 indicate the number of bits which are necessary to specify the value of data whose amplitude range is determined by the 3-bit amplitude range data. Taking the amplitude range data "010" shown in FIG. 14 as an example, the amplitude is any one of −2, −2, 2 and 3 and, hence, two extra bits are needed to specify one data out of such four data. Although 3-bit data are necessary to represent data lying in the range of −3 to 3, two extra bits suffice to specify data within such a range because a particular amplitude range is designated by the amplitude range data. In this manner, assuming that the number of bits necessary to represent amplitude data itself is n+1, n bits of additional data suffice so long as an amplitude range is specified by amplitude range data.

The amplitude range data outputted by the priority encoder 52 is fed to a two-dimensional Huffman coding section 28 and a fixed length buffer 30. The Huffman coding section 28 applies two-dimensional Huffman coding to the run-length of zeros and the amplitude range which are fed thereto from the zero run-length counter 20 and the amplitude detecting section 24, respectively. Specifically, in the illustrative embodiment, the Huffman coding section 28 codes nine bits of data in total, i.e., a zero run-length having six bits and an amplitude range having three bits. The Huffman coding section 28 delivers to the fixed length buffer 30 predetermined m bits of data produced by two-dimensional Huffman coding and the length of the Huffman-coded data, i.e. Huffman code length.

Figure 5:
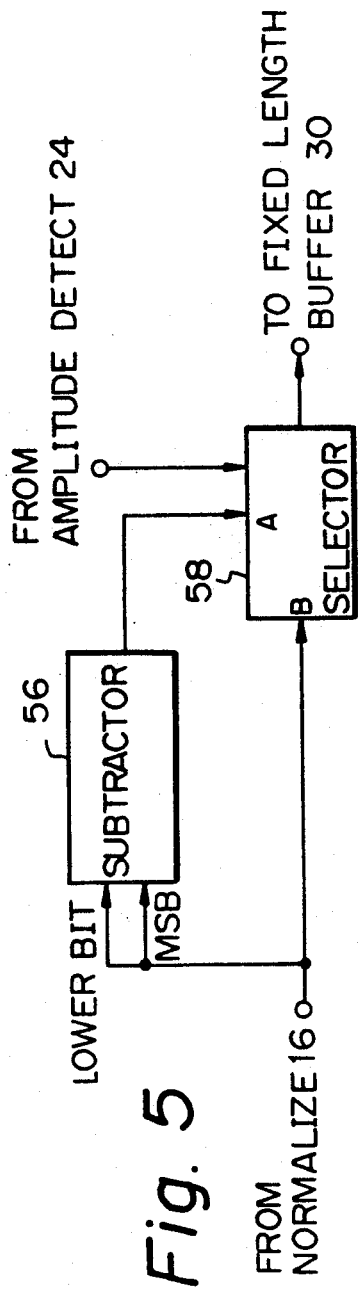
FIG. 5 is a schematic block diagram showing a specific construction of an extra bit calculating section shown in FIG. 1.

Referring to FIG. 5, a specific construction of the extra bit calculating section 26 is shown to include of a subtractor 56 and a selector 58. The calculating section 26 receives the normalized transform coefficients from the normalizing section 16 and the overflow signal from the amplitude detecting section 24. Applied to the subtractor 56 are the lower 7-bit data of the transform coefficients and the MSB (Most Significant Bit) data of the lower 7-bit data. In response, the subtractor 56 subtracts the MSB data from the lower 7-bit data of the transform coefficients. A signal representative of the MSB data is a ZERO when the lower 7-bit data is positive and a ONE when the lower 7-bit data is negative. The output of the subtractor 56 is fed to one input A of the selector 58 as data having seven or less bits. The n-bit transform coefficients from the normalizing section 16 are directly applied to the other input B of the selector 58. The overflow signal from the amplitude detecting section 24 is also applied to the selector 58, as illustrated. When the overflow signal is a ZERO, i.e., when no overflows have occurred, the selector 58 produces not more than seven bits of data being applied to the input A. When the overflow signal is a ONE indicating the occurrence of an overflow, the selector 58 produces the n-bit transform coefficient data being applied to the input B. Hence, data having not more than seven bits will appear when the output of the extra bit calculating section 26 does not involve an overflow, while n-bit data will appear when the latter involves an overflow.

Figure 6:
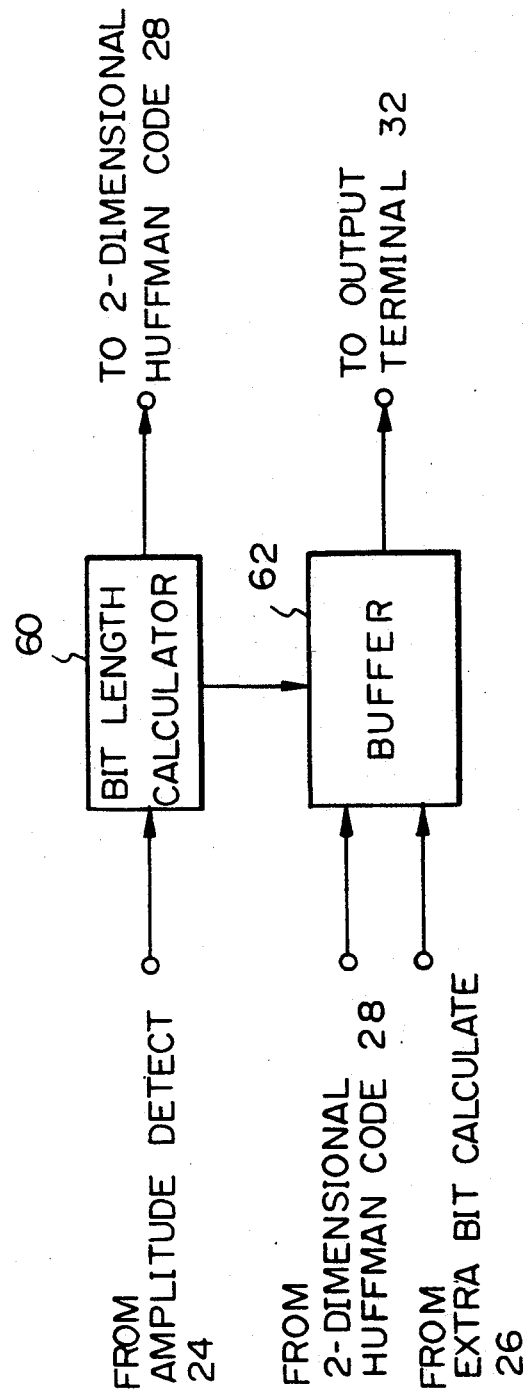
FIG. 6 is a schematic block diagram showing a specific construction of a fixed length buffer of FIG. 1.

FIG. 6 depicts a specific construction of the fixed length buffer 30. As shown, the fixed length buffer 30 is made up of a bit length calculator 60 and a buffer 62. The bit length calculator 60 receives amplitude range data from the amplitude detecting section 24 and a Huffman code length from the two-dimensional Huffman coding section 28. The bit length calculator 60 calculates the total number of bits of Huffman-coded data and extra bit data to be added to the coded data from the input amplitude range and Huffman code length and, based on the result of calculation, sends an address signal to the buffer 62. Since the extra bit data does not exceed seven bits when no overflows have occurred and have n bits when an overflow has occurred, the sum of the extra bit data and Huffman-coded data bits is fed to the buffer 62. Also fed to the buffer 62 are the one to n extra bits from the extra bit calculating section 26 and the Huffman-coded data from the Huffman coding section 28. The buffer 62 writes such data in a particular address which is designated by the address signal which is fed thereto from the bit length calculator 60 as previously stated. The data so written in the buffer 62, i.e., Huffman-coded data and extra bit data are fed out to an output terminal 32 in pairs on the basis of predetermined number of data bits. The output terminal 32 is connected to a transmission path or to a magnetic disk or similar recording medium.

The operation of the compression coding device having the above construction may be summarized as follows. Input picture data are divided into a plurality of blocks by the dividing section 12 and then subjected to two-dimensional orthogonal transform by the orthogonal transforming section 14. Transform coefficients resulting from the orthogonal transform undergo the previously stated coefficient discarding and normalizing procedures as executed by the normalizing section 16. Non-zeros and amplitudes are detected out of the normalized transform coefficients by the non-zero detecting section 18 and the amplitude detecting section 24, respectively. Zero run-length data and amplitude range data from the zero run counter 20 and amplitude detecting section 24, respectively, are subjected to two-dimensional Huffman coding by the two-dimensional Huffman coding section 28.

The Huffman-coded data are applied to the fixed length buffer 30 to see if they involve an overflow by referencing the amplitude range data. If no overflows are present, data produced by adding one to seven extra bit data to the coded data is outputted; if an overflow is present, data produced by adding n extra bit data to the coded data is outputted. Therefore, when an overflow does not exist, picture data can be compressed by transmitting or recording the Huffman-coded data and a minimum number of additional bit data. On the other hand, when an overflow exists, data which is the sum of the coded data and additional bit data is outputted and, hence, picture data can be outputted faithfully in the form of extra bit data which are the picture data themselves. This is successful in eliminating the deterioration of picture quality which is ascribable to overflow.

In conventional compression coding devices, data overflows when the amplitude of normalized transform coefficients exceeds a predetermined range, i.e., when the number of bits of transform coefficients exceeds a predetermined number of bits. For example, assume that in the n-bit data shown in FIG. 13 the amplitude range is n−1 bits. Then, if the n bits of data have a negative value, data ONE at the uppermost bit will be neglected and the amplitude range will be determined by the other n−1 bits of data. Data Huffman-coded by this amplitude range and zero run-length are outputted together with extra bit data. When such data are decoded, the data ONE at the uppermost bit is decoded in the same manner as data ZERO. As a result, the decoded image data renders a picture which has suffered from the inversion of black and white and is therefore poor in quality. Especially, when the normalizing section 16 is provided with a relatively small normalizing coefficient α in order to reduce the compression ratio, normalized transform coefficients will have large values tending to cause the overflow and thereby degrading the picture quality. The conventional devices, therefore, cannot achieve high picture quality even if the compression ratio is reduced.

In the embodiment shown and described, when an overflow occurs with respect to a predetermined amplitude range, compressed data are outputted with extra bit data representative of picture data being added thereto. Since the extra bit data is representative of a value of picture data, it will reproduce the original picture data when decoded and, therefore, picture quality is protected against degradation due to overflow.

Further, the illustrative embodiment determines an amplitude range by amplitude range data and outputs such amplitude range data together with a zero run-length after Huffman-coding the data. Therefore, when data overflows as discussed earlier, this data is representative of a value other than the values lying in the range which is designated by amplitude range data. Such data can be represented by a number of extra bits which is smaller by one than the number of bits originally representing the data. For example, assume that the amplitude data lies in the range of −255 to −128 or 128 to 255, as shown in FIG. 14. Then, the amplitude data can be specified by eight extra bits. When the amplitude data is included in the range of −255 to 255 and expected to be represented by nine bits of data, it can be rendered by eight bits of data because the data from −127 to 127 have been excluded.

Figure 12:
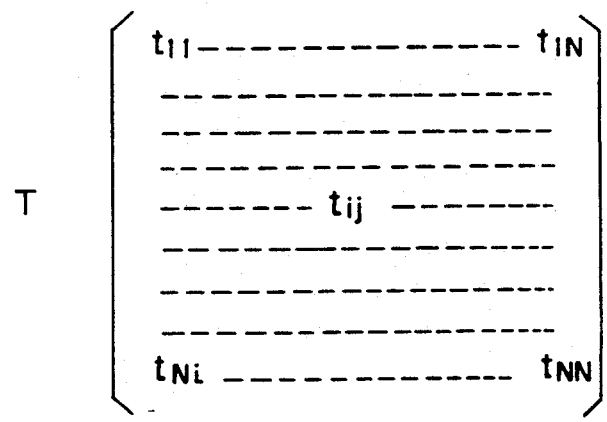
FIG. 12 shows an example of data which may be stored in a weight table.

When use is made of the weight table T shown in FIG. 12, low frequency components and high frequency components will be divided by small values and large values, respectively, instead of the transform coefficients being divided by a single value α. More specifically, low frequency components which are significant data will be coded by a small compression ratio, while high frequency components which are not so significant will be coded by a large compression ratio. This eventually increases the overall compression ratio and, yet, enhances high quality coding. Conversely, compressing low frequency components by a large compression ratio will eliminate the previously discussed overflow.

The weight table T may be loaded with any suitable data as needed. Data designating the weight table T or table data themselves may be outputted to allow a decoding device which will be described to operate by using such data.

Figure 7:
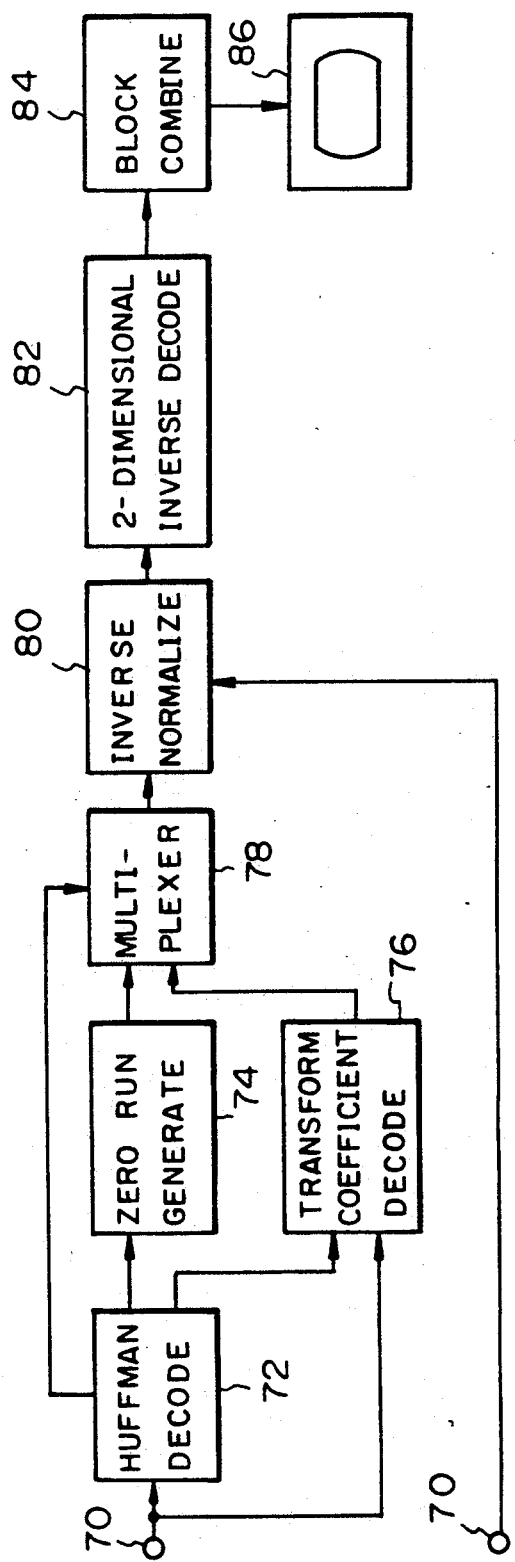
FIG. 7 is a schematic block diagram showing an expansion decoding device also embodying the present invention and constructed to decode compressed picture data from the coding device of FIG. 1.

Referring to FIG. 7, a decoding device embodying the present invention is shown which decodes compressed picture data outputted by the device of FIG. 1 by expansion. As shown, the decoding device has an input terminal 70 to which compressed picture data from the coding device of FIG. 1, i.e., Huffman-coded data from the two-dimensional Huffman-coding section 28 and the extra bit data from the extra bit calculating section 26 are applied. The Huffman-coded data is fed to a Huffman decoding section 72. The Huffman decoding section 72 decodes the input data on the basis of data which are fed thereto from a Huffman table, not shown, thereby determining a zero run-length and a non-zero amplitude range. Data representative of the zero run-length and data representative of the non-zero amplitude range are fed from the decoding section 72 to a zero run generating section 74 and a transform coefficient decoding section 76, respectively. Further, a zero/non-zero switching signal is fed from the coding section 72 to a multiplexer 78. On the other hand, the extra bit data arrived at the input terminal 70 is routed to the transform coefficient decoding section 76.

The zero run generating section 74 generates zero data the number of which conforms to the zero run-length data fed from the Huffman decoding section 72, i.e., a particular number of zeros associated with the zero run-length. The zero run data outputted by the zero run generating section 74 is applied to the multiplexer 78.

The transform coefficient decoding section 76 decodes n-bit non-zero transform coefficients on the basis of the non-zero amplitude range data fed from the Huffman decoding section 72 and the extra bit data fed from the input terminal 70. When the amplitude range data is not "000", meaning that the overflow detecting circuit 50, FIG. 5A, has not detected an overflow, the transform coefficient decoding section 76 produces non-zero transform coefficients by using the 3-bit amplitude range data and extra bit data. When the amplitude range data is "000" which shows that the overflow detecting circuit 50 has detected an overflow, the transform coefficient decoding section 76 produces non-zero transform coefficients by using the n-bit extra bit data fed thereto from the input terminal 70. In the event of an overflow, non-zero transform coefficients themselves will have been sent by additional bit data and, hence, they are outputted as decoded transform coefficients. The output of the transform coefficient decoding section 76 is applied to a multiplexer 78.

The multiplexer 78 selects, in response to the zero/non-zero switching signal from the Huffman decoding section 72, either one of the zero run data and the n-bit non-zero transform coefficients which are fed thereto from the zero run generating section 74 and the transform coefficient generating section 76, respectively. Specifically, the multiplexer 78 selects the zero run data when the zero/non-zero switching signal is indicative of zero, and the multiplexer selects the transform coefficients when the switching signal is indicative of non-zero. The output of the multiplexer 78 is applied to an inverse normalizing section 80.

Normalizing coefficient data comes in through the input terminal 70 together with the picture data and is applied to the inverse normalizing section 80. By using the normalizing coefficient data, the inverse normalizing section 80 inversely normalizes the decoded data from the multiplexer 78, i.e., the inverse normalizing section 30 multiplies the decoded data by the normalizing coefficient $\alpha$. When use is made of data which have been normalized on the basis of the weight table T, as illustrated in FIG. 12, the data of the weight table T will be applied to the input terminal 70 so as to multiply the output data of the multiplexer 78 by $\alpha \cdot T$.

The output of the inverse normalizing section 80 is fed to a two-dimensional orthogonal inverse transforming section 82. The inverse transforming section 82 applies two-dimensional orthogonal inverse transform to the output data of the inverse normalizing section 80. The output of the inverse transforming section 82 is routed to a combining section 84. The combining section 84 combines the plurality of blocks to reproduce picture data representative of the whole original picture. The picture data from the combining section 84 are fed to a CRT (Cathode Ray Tube) 86 to be reproduced thereon. If desired, the picture data may be fed to a printer or similar recorder in place of the CRT 86.

The decoding device having the above construction is capable of decoding picture data having been compressed by the coding device of FIG. 1 by expansion.

As stated previously, the coded data from the input terminal 70 is decoded by the Huffman decoding section 72 to produce a zero run length and a non-zero amplitude range. The zero run generating section 74 and the transform coefficient decoding section 76 output respectively zero data the number of which conforms to the run length and non-zero transform coefficient data. The transform coefficient decoding section 76 decodes transform coefficients by the amplitude range data and extra bit data when the amplitude lies in a predetermined range, while producing transform coefficients on the basis of n-bit extra bit data when otherwise, as stated earlier. It follows that even when the amplitude exceeds the predetermined range, transform coefficients can be produced by using the extra bit data. This eliminates the omission of data which is apt to occur due to the overflow of data when coded data are decoded by using an amplitude range only, whereby a reproduced picture is free from the deterioration of quality ascribable to overflow.

As described above, the decoding device decodes data produced by Huffman-coding a zero run-length and a non-zero amplitude range and extra bit data which is derived from an overflow, thereby reproducing a picture. This allows picture data compressed on the basis of an amplitude range to be decoded by expansion. Even though the amplitude range may have overflown at the time of compression, the image can be reproduced by using extra bit data.

The inverse normalizing section 80 performs inverse normalization by using the normalizing coefficient $\alpha$ and weight table T which are fed thereto together with picture data through the input terminal 70. This inverse normalizing section 80, therefore, decodes coded data in conformity to a normalizing coefficient and a weight table which were used in the coding stage, i.e., it is capable of decoding various kinds of data which were coded in matching relation to picture data.

When data are coded by using a weight table as stated above, normalized data may be decoded by assigning small divisors to low frequency components and large divisors to high frequency components. This allows low frequency components which are significant data to be compressed by a small compression ratio and high frequency components which are not so significant by a large compression ratio, whereby a picture is reconstructed with high quality. If desired, a large compression ratio may be applied to low frequency components so as to decode data which are free from overflows and to thereby reproduce a high quality picture. The use of weight table data is successful in decoding picture data with no regard to the kind of a weight table which is adapted for coding.

Figure 8:
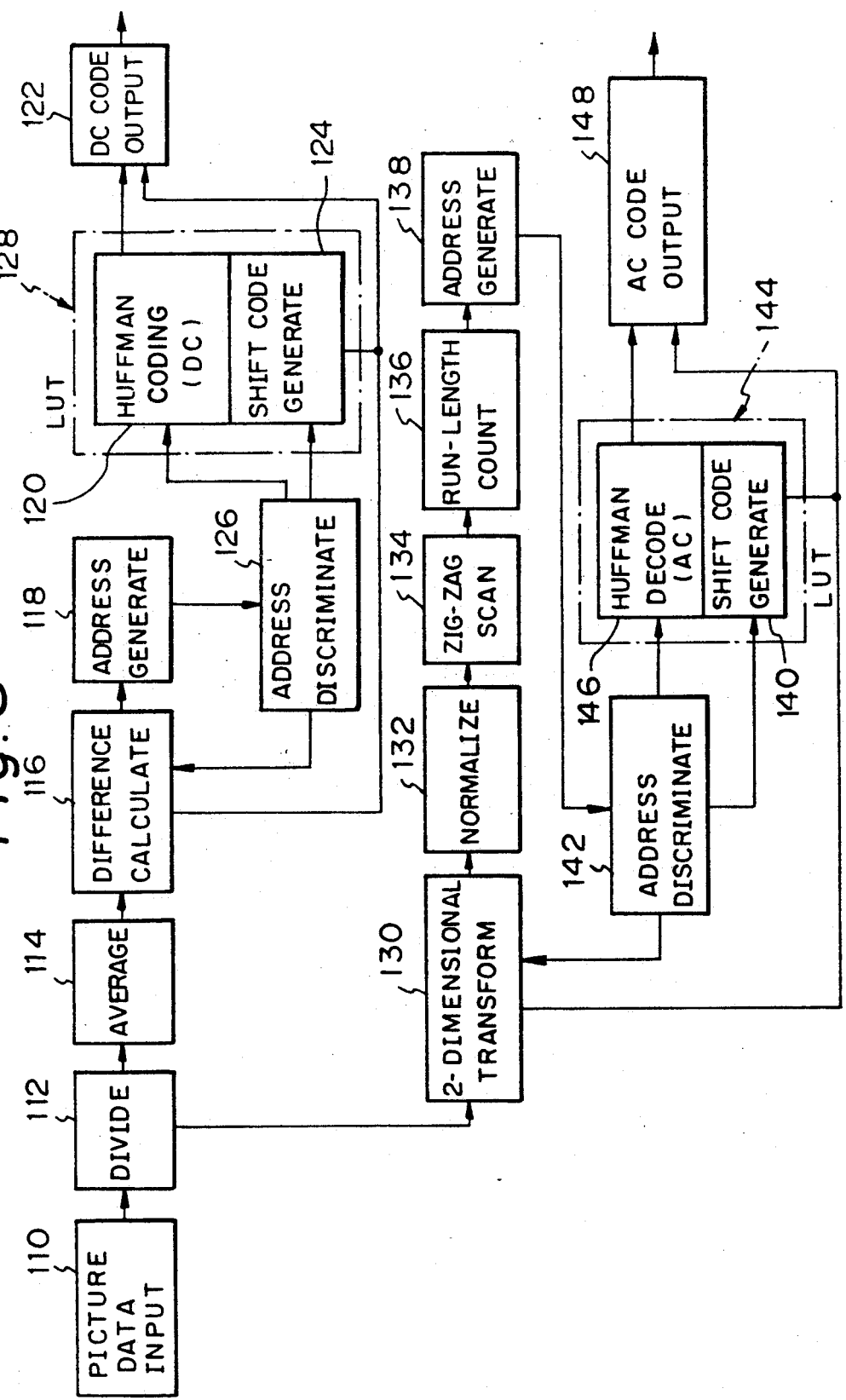
FIG. 8 is a schematic block diagram showing an alternative embodiment of the coding device in accordance with the present invention.

Referring to FIG. 8, an alternative embodiment of the compression coding device in accordance with the present invention is shown. As shown, the coding device has a dividing section 112 which is implemented by a frame buffer. Picture data representative of one frame of still picture picked up by an electronic still camera is fed to and stored in the dividing section 112 via a picture data inputting section 110. The one frame of picture data stored in the dividing section 112 is read out of the dividing section 112 in a plurality of blocks and applied block by block to an averaging section 114 and a two-dimensional orthogonal transforming section 130.

Figure 18:
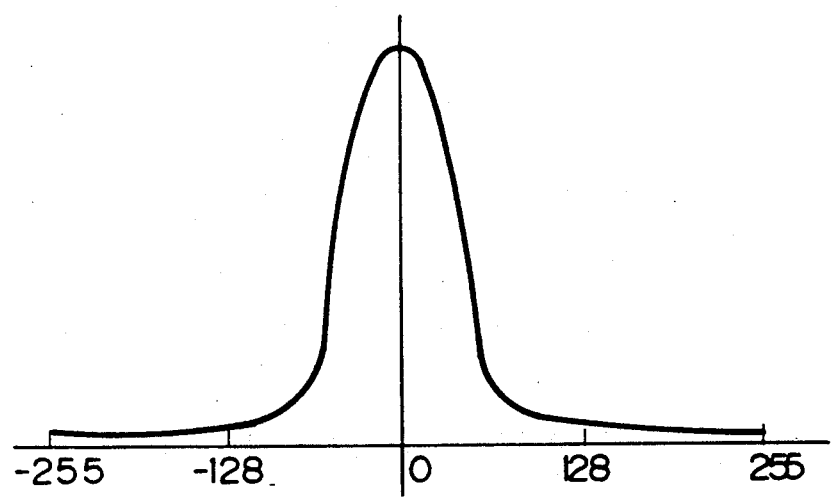
FIG. 18 is a graph showing the probability of occurrence of data which are outputted by a difference calculating section shown in FIG. 8.

The averaging section 114 produces a mean value of each block of data fed thereto from the dividing section 112, i.e., a DC component of each block. The output of the averaging section 114 is fed to a difference calculating section 116. The difference calculating section 116 produces a difference in mean value between the block just fed from the calculating section 114 and the immediately preceding block and delivers it to an address generating section 118. The output of the averaging section 114 is data ranging from 0 to 255 (eight bits), for example, while the output of the difference calculating section 116 is data ranging from −255 to 255 (nine bits), for example. The difference from the calculating section 116 is distributed with a probability which is shown in FIG. 18. As shown, 0 occurs with the highest probability, and the probability sequentially decreases with the increase in the difference. The differences of less than −128 and greater than 128 occur with extremely low probability. Such a distribution stems from the fact that the mean value (DC component) noticeably varies from one block to the next block.

The address generating section 118 generates an address for Huffman coding on the basis of the difference fed thereto from the difference calculating section 116. Specifically, it transforms the input difference data −255 to 255 into any of addresses 1 to 511. The output of the address generating section 118 is applied to an address discriminating section 126. In response to the address from the address generating section 118, the address discriminating section 126 determines in which of the ranges of −255 to −128 and 128 to 255 (shift regions) the difference calculated by the difference calculating section 116 lies. The output of the discriminating section 126 is routed to a look-up table (LUT) 128. The look-up table 128 is made up of a Huffman coding section 120 and a shift code generating section 124.

When the difference outputted by the calculating section 116 exists in either one of the above-mentioned shift regions, the address discriminating section 126 generates a shift code from its shift code generating section 124 because the probability of such a difference is extremely low. In this case, as shown in FIG. 16, the shift code from the shift code generating section 124 and the difference data from the calculating section 116 are fed to a DC code outputting section 122. The difference data from the difference calculating section 116 has nine bits lying in the range of −255 to 255, as previously stated. However, when a shift code is generated, the difference data shown in FIG. 16 can be represented by eight bits because it exists in the range of −255 to −128 or 128 to 255.

As stated above, as long as the difference data is the data lying in the either one of the shift regions the probability of which is low, data made up of the shift code and difference data is applied to the DC code outputting section 122. The decoding device is capable of decoding the original difference out of the shift code and difference data.

On the other hand, when the difference outputted by the calculating section 116 does not lie in any of the above-mentioned shift regions, i.e., it lies in the range of −127 to 127 as shown in FIG. 18, the address discriminating section 126 detects it and delivers a control signal to the Huffman coding section 120 of the look-up table 128. In this case, since the data has a substantial probability, the look-up table for Huffman coding is not loaded with a great amount of data and, hence, the Huffman coding section 120 executes ordinary Huffman coding. The output of this Huffman coding section 120 is applied to the DC code outputting section 122.

Figure 19:
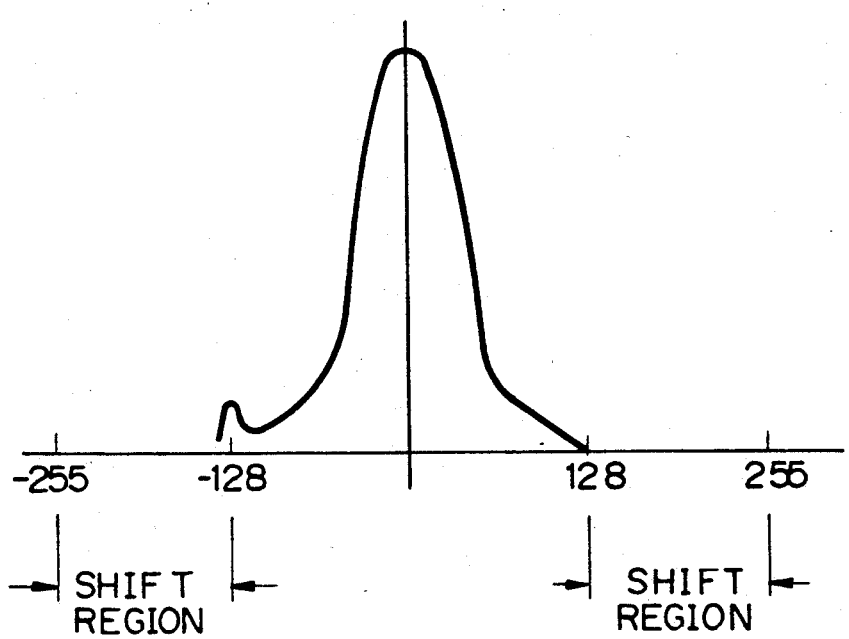
FIG. 19 is a graph showing the probability of occurrence of output data of the difference calculating section shown in FIG. 8, which is achieved with a shift code.

FIG. 17 shows a specific format of data which may be outputted by the DC coding section 122. As shown, Huffman codes are outputted for the first difference "25" and second difference "7", while data including a shift code is outputted for the third difference "−131". Further, a Huffman code is outputted for the fourth difference "16". It is to be noted that since the address generating section 18 produces the address of −128 for data lying in the range of −255 to −128 or 128 to 255, the probability of −128 increases, as shown in FIG. 19. As a result, the data coded by the Huffman coding section 120 will have a length which varies as shown in FIG. 20.

The output of the dividing section 112, i.e., a block of picture data is also routed to a two-dimensional orthogonal transforming section 130 and thereby subjected to two-dimensional orthognal transform. The output of the transforming section 130 is applied to a normalizing section 132. The normalizing section 132 normalizes the picture data from the transforming section 130 after discarding particular coefficients, as in the previous embodiment. The normalized transform coefficients, like the non-normalized data shown in FIG. 10, are arranged in blocks.

A zig-zag scanning section 134 scans the individual blocks of normalized transform coefficients sequentially in a zig-zag configuration from the lowest frequency component, as shown in FIG. 11. The output of the scanning section 134 is fed to a non-zero detecting section which may be implemented by n inverters by way of example, as shown in FIG. 2. The non-zero detecting section discriminates zeros and non-zeros and delivers them to a run-length counting section 136 which may be constituted by an inverter and a counter, as shown in FIG. 3. The run-length counting section 136 determines the run-length of zero data. The determined run-length of zero data and the amplitude of non-zero data appearing thereafter are routed to an address generating section 138.

Figures 20, 21A:
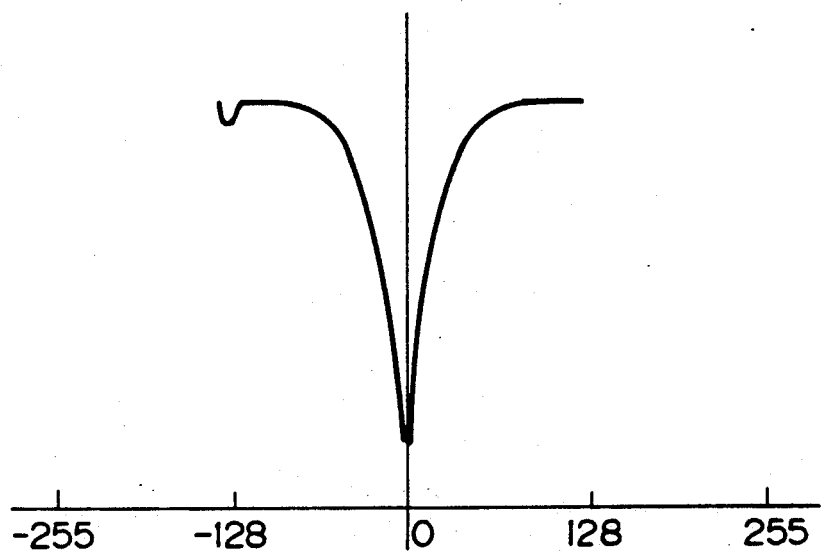
FIG. 20 is a graph showing the lengths of data coded by a Huffman coding section of FIG. 8.
FIG. 21A shows a specific format of output data of an address generating section shown in FIG. 8.

In this embodiment, since each block is sized $8 \times 8 = 64$, the maximum run-length of zero data is sixty-four and, hence, the run-length of zeros is represented by six bits, as shown in FIG. 21A. The amplitude of non-zeros is represented by three bits, as also shown in FIG. 21A.

Figure 24:
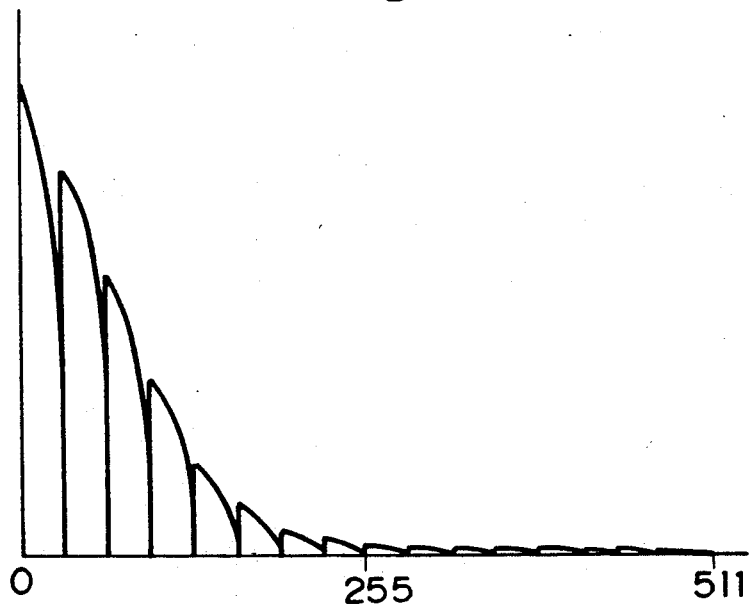
FIG. 24 is a plot showing the probability of occurrence of data which are generated by the address generating section of FIG. 8.

The address generating section 138 generates an address in the form of 9-bit data which is composed of 6-bit data representative of the above-mentioned zero run-length and 3-bit data representative of the non-zero amplitude. More specifically, the address generating section generates 512 addresses in total, i.e., 0 to 511 by using an upper address and a lower address which include the six bits and the three bits, respectively. FIG. 24 indicates the frequency of occurrence of the 512 addresses. As shown, the frequency of occurrence of particular addresses is zero because the lower three bits representative of an amplitude of non-ZEROs will never be zero.

The output of the address generating section 138 is fed to an address discriminating circuit 142. This address discriminating circuit 142 determines whether or not the 9-bit address fed thereto from the address generating section 138 is greater than 255. If the address does not exceed 255, i.e., if the zero run-length does not exceed 32, the address discriminating circuit 142 further determines whether or not the non-zero data involves a predetermined overflow. The output of the address discriminating section 142 is applied to a look-up table 144. The look-up table 144 is made up of a Huffman coding section 146 and a shift code generating section 140. If the non-zero data does not involve any overflow, the address discriminating circuit 142 delivers a control signal to the Huffman coding section 146 of the look-up table 144 so as to execute ordinary two-dimensional Huffman coding. Specifically, the Huffman coding section 146 subjects the address from the address generating section 138, i.e., the zero run-length and non-zero amplitude data to two-dimensional Huffman coding. In this case, since the zero run-length and non-zero amplitude data has a substantial probability of occurrence, the amount of data in the look-up table is not so large and, therefore, ordinary two-dimensional Huffman coding is executed. The coded data from the Huffman coding section 146 is routed to an AC code outputting section 148.

Figure 25:
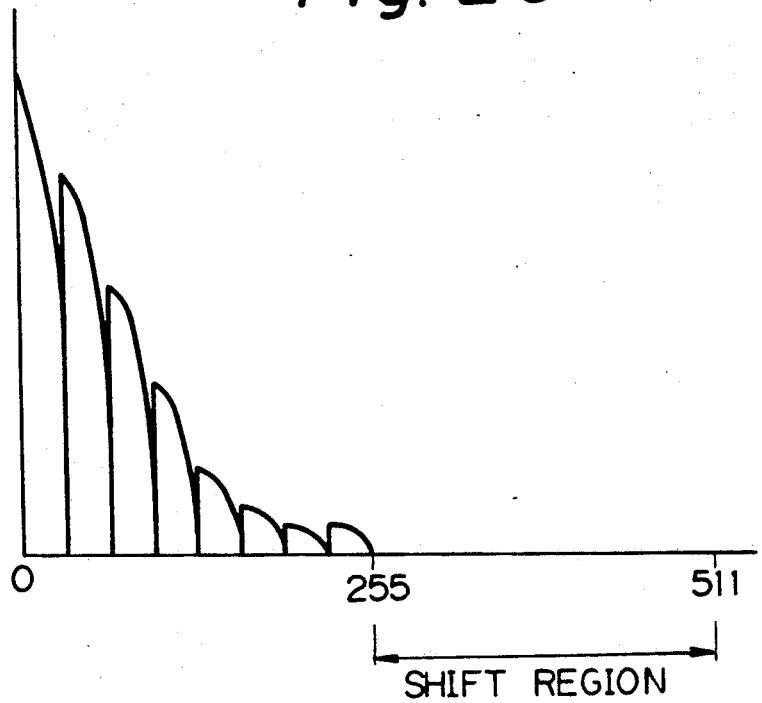
FIG. 25 is a plot showing the probability of occurrence of data which are generated by the address generating section of FIG. 8 which is achieved with a shift code.

On the other hand, if the address from the address generating section 138 exceeds 255, i.e., the zero runlength exceeds 32, the address will lie in a shift range as shown in FIG. 25. Then, the address discriminating circuit 142 feeds control signals to the shift code generating section 140 and two-dimensional orthogonal transforming section 130. It is to be noted that even when the address does not exceed 255, the address discriminating circuit 142 also delivers control signals to the shift code generating section 140 and orthogonal transforming section 130 if the non-zero data involves an overflow. In response to the control signal, the shift code generating section 140 generates, by using the transform coefficients fed from the orthogonal transforming section 130, a shift code which is the output of the look-up table associated with an 8-bit input, as shown in FIG. 21B. In FIG. 21B, the shift code is shown to include the uppermost bit which is "1", four intermediate bits which are the upper four bits of transform coefficients fed from the orthogonal transforming section 130, and the lower three bits which are "000". The 8-bit shift code indicates that the address generated by the address generating section 138, i.e., the data to be subjected to Huffman coding does not exist in the predetermined range.

Figure 26:
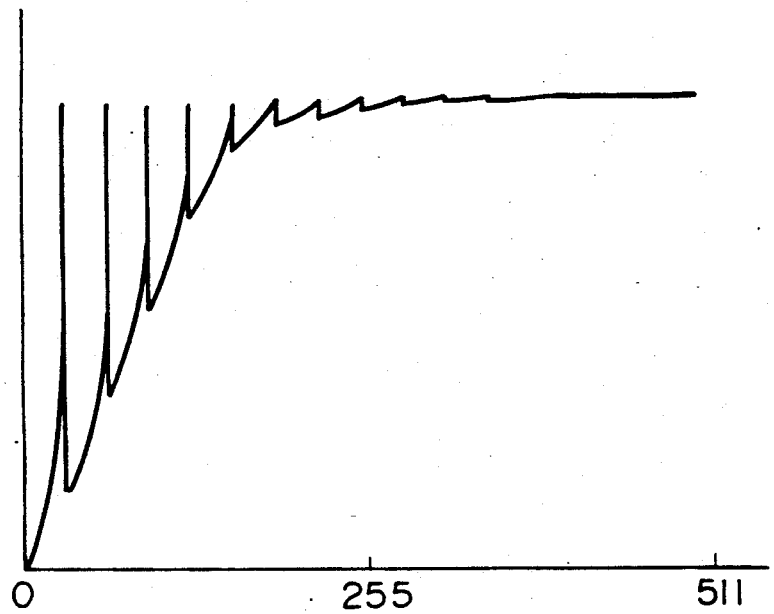
FIG. 26 is a plot showing the lengths of data coded by the Huffman coding section of FIG. 8.

FIG. 26 depicts the code lengths of Huffman-coded data and shift codes. As shown, comparatively short coded data are assigned to those Huffman-coded data whose frequency of occurrence is high, while comparatively long coded data are assigned to the others whose frequency of occurrence is low. Concerning the shift code, it is an output of the look-up table associated with an 8-bit input and the lower three bits thereof are ZEROs. Hence, shift codes are associated with the portions of the curve of FIG. 24 the frequency of occurrence of which has been zero from the first, and they are assigned to those portions where the length of Huffman-coded data is long and which have not been used from the first.

When the shift code generating section 140 generates a shift code, the shift code is applied to the AC code outputting section 148 together with the zero runlength (six bits) from the address generating section 138 and the lower twelve bits of transform coefficients from the two-dimensional orthogonal transforming section 130, as shown in FIG. 22.

FIG. 23 shows a specific format of data which may be fed out from the AC code outputting section 148. In the figure, for the first data which has an amplitude range of 2 and a run-length of 7, an ordinary Huffman code is outputted. For the next data whose amplitude range is 7 and run-length is 33 which is greater than 32, data including a shift code is outputted. For the subsequent data which has an amplitude range of 5 and a run-length of 1, an ordinary Huffman code is fed out.

As described above, concerning a DC component, the illustrative embodiment causes the shift code generating section 124 to output a shift code if the difference data from the difference calculating section 116 lies in the shift region, and outputs the shift code together with the difference data. If the difference data does not lie in the shift region, the embodiment executes ordinary Huffman coding. It is not necessary, therefore, to load the look-up table 128 with a look-up table listing a large amount of data for data whose probability of occurrence is low, whereby a look-up table having a small capacity suffices. Moreover, the coding efficiency is hardly lowered because the shift region wherein Huffman coding is not effected occurs with a minimum of probability.

Concerning AC component data, if the address from the address generating section 138, i.e., data to be coded does not lie in the shift region having high frequency of occurrence and the non-zero amplitude does not involve an overflow, the Huffman coding section 146 performs ordinary Huffman coding by using a look-up table from the Huffman look-up table 44. If the data to be coded lies in the shift region having low frequency of probability or if the non-zero amplitude involves an overflow, the shift code generating section 140 generates a shift code as previously stated without ordinary Huffman coding being executed so that the run-length and transform coefficients are outputted.

Since shift codes are the data associated with those portions where Huffman-coded data are absent, they are prevented from being mixed up with Huffman-coded data. In the event when a shift code is outputted, the run-length and transform coefficients are directly fed out. In response to these data, the decoding device is capable of reproducing original data without the need for Huffman decoding. Further, since a shift code includes the upper four bits of transform coefficients, only the lower twelve bits suffice for the transform coefficients to be included in the data which should be outputted together with a shift code.

In the shift region whose frequency of occurrence is low, the illustrative embodiment sends out a shift code, run-length and transform coefficients instead of executing ordinary Huffman coding, as described above. In this region, therefore, a look-up table for Huffman coding is not needed. Heretofore, a look-up table has been essential even in such a region. Moreover, it has been customary to load a look-up table with coded data having substantial data lengths for the above shift region despite such a region being low in frequency and rarely used, which results in the need for a look-up table having a large storing capacity. In contrast, with the illustrative embodiment, it is not necessary to store look-up table data for the shift regions. This is successful in reducing the required capacity of the look-up table 144. Furthermore, the region wherein Huffman-coding is not executed occurs with extremely low probability and, therefore, hardly degrades the coding efficiency.

Figure 9:
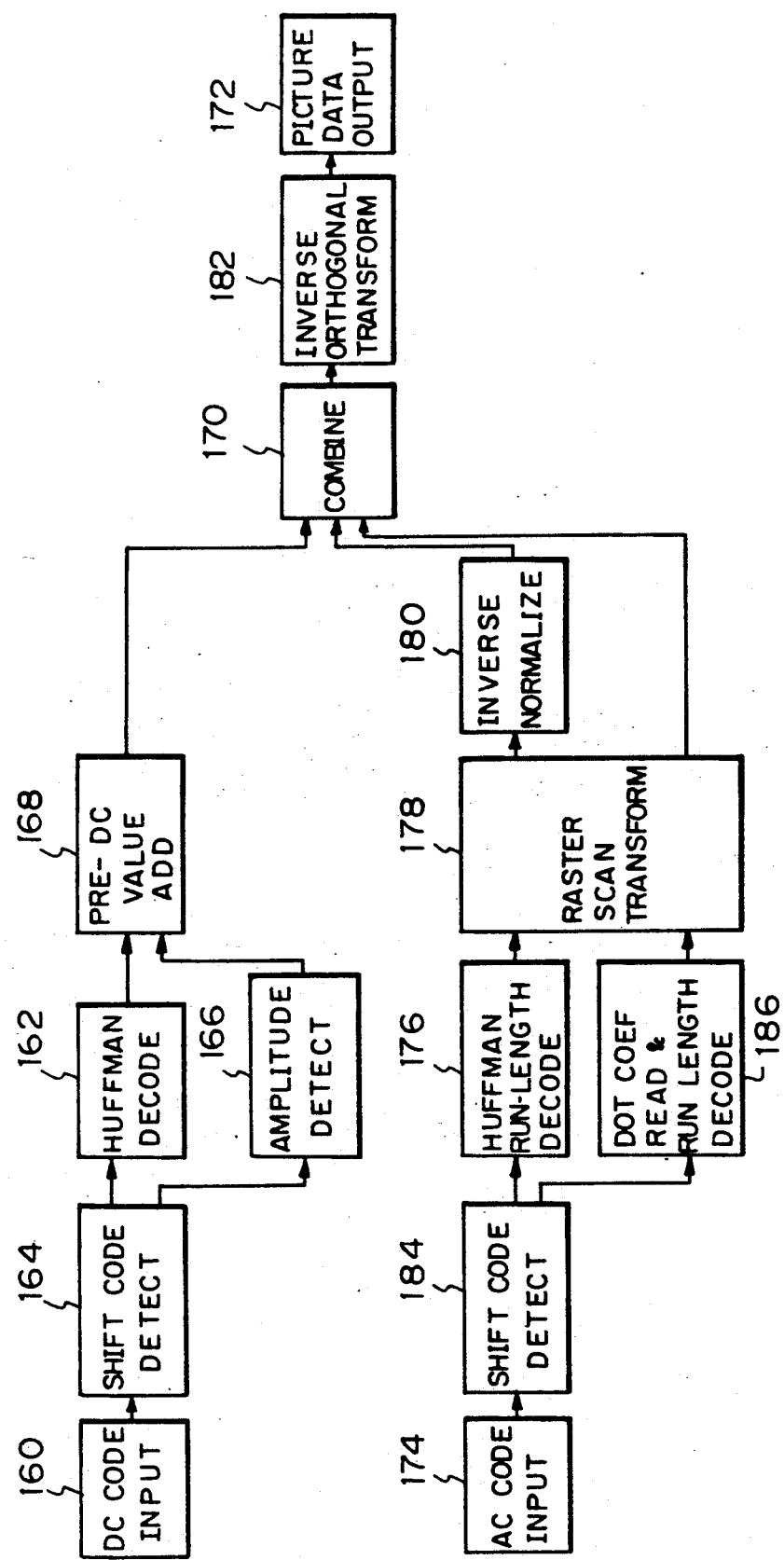
FIG. 9 is a schematic block diagram showing an alternative embodiment of the decoding device in accordance with the present invention.

Referring to FIG. 9, an alternative embodiment of the expansion decoding device in accordance with the present invention is shown. The decoding device shown in FIG. 9 decodes by expanding the picture data which have been coded by the coding device of FIG. 8. The alternative embodiment has a DC code inputting section 160 and an AC code inputting section 174. The DC component and AC component of picture data compressed by the coding device of FIG. 8 are applied to the DC code and AC code inputting sections 160 and 174, respectively.

Specifically, data including Huffman-coded data from the Huffman coding section 120 of FIG. 8 and shift code from the shift code generating section 124 is applied to the DC code inputting section 160. The input DC component data is fed to a shift code detecting section 164. The shift code detecting section 164 detects the shift code added by the device of FIG. 8 out of the DC component data and delivers it to a Huffman decoding section 162 and an amplitude detecting section 166. When the shift code detecting section 164 finds no shift codes, the Huffman decoding section 162 Huffman-decodes the data fed thereto from the DC code inputting section 160. The output of the Huffman decoding section 162 is applied to a pre-DC value adding section 168.

On detecting a shift code, the shift code detecting section 164 delivers the input data to an amplitude detecting section 166. The amplitude detecting section 166 extracts an 8-bit difference from the data including a shift code as shown in FIG. 16, thereby calculating data corresponding to the difference which was calculated by the difference calculating section 116 of FIG. 8. In this case, the difference lies in the range of −255 to −128 or 128 to 255 shown in FIG. 19, so that the original difference data can be produced on the basis of extracted 8-bit DC difference. Both the output of the Huffman decoding section 162 and the output of the amplitude detecting section 166 are the difference data and are added by the pre-DC adding section 168 to the mean value (DC component) of the precedent block, which has already been calculated by the adding section 168. The output of the pre-DC adding section 168, i.e., the mean value of the particular block is fed to a combining section 170.

Applied to the AC code inputting section 174 is the data including Huffman-coded data from the Huffman-coding section 146 of FIG. 8 and shift code from the shift code generating section 140. The input AC component data are routed to a shift code detecting section 184. The shift code detecting section 184 detects the shift code added by the device of FIG. 8 out of the AC component data and delivers it to a Huffman run-length decoding section 176 and a DCT coefficient reading and run-length decoding section 186. When the shift code detecting section 184 finds no shift codes in the input data, the Huffman run-length decoding section 176 Huffman-decodes the data applied thereto from the AC code inputting section 174. The output of the Huffman decoding section 176 is applied to a raster scan transforming section 178.

The raster scan transforming section 178 scans the input data according to the zero run-length and non-zero amplitude which are represented by the output data of the Huffman run-length decoding section 176, whereby data arranged in rows and columns are reconstructed. The output of the raster scan transforming section 178 is routed to an inverse normalizing section 180 and inversely transformed thereby. The output of the inverse normalizing section 180 is fed to the combining section 170 which includes a plurality of data blocks. The resulting composite data are applied to an orthogonal inverse transforming section 182.

On detecting a shift code, the shift code detecting section 184 delivers the input data to the DCT coefficient reading and run-length decoding section 186. In response, the decoding section 186 extracts a 6-bit run-length and lower 12-bit DCT coefficient data out of the data including a shift code as shown in FIG. 22. It also extracts upper 4-bit DCT coefficient data as shown in FIG. 21B out of the shift code data. Consequently, a zero run-length and sixteen bits of non-zero DCT coefficients are produced. The DCT coefficient reading and run-length coding section 186 delivers its output to the raster scan transforming section 178. Then, the transforming section 178 scans the input data according to the zero run-length and non-zero amplitude represented by the output data of the decoding section 186, thereby reconstructing data which are arranged in rows and columns. The output of the raster scan transforming section 178 is fed to the combining section 170 and therefrom to the orthogonal inverse transforming section 182. The combining section 170 combines a plurality of blocks of data to reproduce picture data representative of the entire original picture. The composite picture data from the combining section 170 is routed through the orthogonal inverse transforming section 182 to a picture data outputting section 172.

As stated above, the illustrative embodiment determines if a component, whether it be a DC component or an AC component, includes a shift code and, if the component includes a shift code, extracts a difference from input data in the case of a DC component and extracts a run-length and DCT coefficients in the case of an AC component. If the component does not include a shift code, it is decoded by ordinary Huffman decoding. Hence, not only Huffman-coded picture data but also data compressed by using shift codes can be decoded.

In summary, it will be seen that the present invention provides a compression coding device which, in the event of coding transform coefficients which have undergone orthogonal transform and normalization, determines if the transform coefficients exceed a predetermined amount of data and, if they overflow, add data representative of transform coefficients to picture data. This prevents the quality of a picture from being lowered by the overflow of data when reproduced by a playback device.

Further, in accordance with the present invention, an compression coding device codes blocks of data which have undergone orthogonal transform by using shift codes instead of Huffman coding when any of the data has low probability of occurrence. Hence, a memory having a minimum of capacity suffices to store look-up table data which are used for Huffman coding. A decoding device associated with such a coding device is capable of decoding the coded data.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A device for coding a picture signal by dividing a single picture of digital picture data into a plurality of blocks and compressing said digital picture data block by block, comprising:

coding means for coding each of the plurality of blocks of digital picture data;

region data detecting means, operatively communicative with said coding means, for detecting that the individual blocks of digital picture data lie in a predetermined range;

output data producing means, operatively communicative with said region data detecting means, for producing output data which includes the coded data;

said output data producing means outputting, depending on whether said digital picture data lies in said predetermined range, data specifying said digital picture data in addition to the coded data produced by said coding means;

orthogonal transforming means for applying two-dimensional orthogonal transform to the individual blocks of digital picture data; and normalizing means for normalizing the transformed data produced by said orthogonal transforming means;

said coding means coding the normalized data produced by said normalizing means;

said region data detecting means comprising overflow detecting means for detecting that an amplitude of the normalized data has exceeded said predetermined range;

said output data producing means outputting, when said overflow detecting means has detected that the amplitude of the normalized data has exceeded said predetermined range, the data specifying the normalized data in addition to the coded data produced by said coding means.

2. A device in accordance with claim 1, wherein said coding means codes a run-length of zeros and an amplitude of non-zeros which are included in the normalized data;

said output data producing means producing a number of bits which is smaller by one than a number of bits necessary for representing the normalized data as the data specifying the normalized data.

3. A device in accordance with claim 1, wherein said normalizing means uses table data and normalizing coefficients and normalizing the transformed data by dividing the transformed data by data which is produced by multiplying said normalizing coefficients and said table data.

4. A device in accordance with claim 1, further comprising:

code coding means for transforming the digital picture data into coded data which includes a predetermined code;

said coding means comprising Huffman coding means;

said region data detecting means comprising shift region data detecting means for detecting that the individual blocks of the digital picture data lie in said predetermined range which occurs with a low predetermined probability;

said output data producing means causing, when the digital picture data lies in said predetermined range as detected by said shift region data detecting means, said code coding means to code and causing, when said digital picture data fails to lie in said predetermined range, said Huffman coding means to code.

5. A device in accordance with claim 4, wherein said Huffman coding means applies Huffman coding to a difference between a mean value of each of the individual blocks of digital picture data and a mean value of an immediately preceding one of said blocks.

6. A device in accordance with claim 1, further comprising:

code coding means for transforming the digital picture data into coded data which includes a predetermined code;

said coding means comprising Huffman coding means;

said region data detecting means comprising shift region data detecting means for detecting that the individual blocks of the digital picture data lie in said predetermined range which occurs with a low predetermined probability;

said data output producing means causing said code coding means to code the digital picture data when the digital picture data lies in said predetermined range as detected by said shift region data detecting means and causing said Huffman coding means to code the digital picture data when the digital picture data fails to lie in said predetermined range.

7. A device in accordance with claim 6, wherein said Huffman coding means codes a run-length of zeros and an amplitude of non-zeros which are included in the normalized data;

the code having a logical ZERO in association with the amplitude of non-zeros of the normalized data and defining an address for accessing a Huffman look-up table.

8. A device for decoding a picture signal by expanding compression-coded digital picture data representative of a single picture by two-dimensional inverse orthogonal transform, comprising:

decoding means for decoding the picture data, said decoding means decodes the picture data to produce a run-length of zeros and an amplitude of non-zeros;

data selecting means for selecting at least one of the decoded data produced by said decoding means and the picture data, said data selecting means producing decoded data by using the amplitude of non-zeros decoded by said decoding means and the picture data;

inverse normalizing means for inversely normalizing the data selected by said data selecting means;

inverse orthogonal transforming means for applying two-dimensional inverse orthogonal transform to the inversely normalized data produced by said inverse normalizing means; and overflow detecting means for detecting, in response to the decoded data produced by said decoding means, that the picture data has an amplitude which exceeds a predetermined range;

said data selecting means selecting, when said overflow detecting means detects that the amplitude of the picture data exceeds said predetermined range, the picture data in addition to the decoded data produced by said decoding means.

9. A device for decoding a picture signal by expanding compression-coded digital picture data representative of a single picture by two-dimensional inverse orthogonal transform, comprising:

decoding means for decoding the picture data;

data selecting means for selecting at least one of the decoded data produced by said decoding means and the picture data;

inverse normalizing means for inversely normalizing the data selected by said data selecting means;

inverse orthogonal transforming means for applying two-dimensional inverse orthogonal transform to the inversely normalized data produced by said inverse normalizing means; and overflow detecting means for detecting, in response to the decoded data produced by said decoding means, that the picture data has an amplitude which exceeds a predetermined range;

said data selecting means selecting, when said overflow detecting means detects that the amplitude of the picture data exceeds said predetermined range, the picture data in addition to the decoded data produced by said decoding means;

said inverse normalizing means uses an inverse normalizing coefficient and table data for normalizing the data by multiplying data produced from multiplying said inverse normalizing coefficient and said table data with the data selected by said data selecting means.

10. A device for decoding a picture signal by expanding compression-coded digital picture data representative of a single picture, comprising:
   Huffman decoding means for Huffman decoding the picture data;
   code detecting means, operatively communicative with said Huffman decoding means, for detecting a predetermined code when the picture data includes said predetermined code;
   code decoding means, operatively communicative with said code detecting means, for decoding the picture data which includes said predetermined code;
   said code detecting means causing said code decoding means to decode the picture data when said code detecting means detects said predetermined code in the picture data and causing said Huffman decoding means to decode the picture data when said code detecting means fails to detect said predetermined code in the picture data.

11. A device in accordance with claim 10, wherein the outputs of said Huffman decoding means and said code decoding means are added to a mean value of each of a plurality of blocks of digital picture data and a mean value of an immediately preceding one of said blocks.

12. A device in accordance with claim 10, further comprising inverse normalizing means for inversely normalizing the decoded data produced by said Huffman decoding means; and
   inverse orthogonal transforming means for applying two-dimensional inverse orthogonal transform to data produced by either one of said inverse normalizing means and said code decoding means.

13. A device in accordance with claim 12, wherein said Huffman decoding means decodes the picture data to produce a run-length of zeros and an amplitude of non-zeros.

14. A method for coding a picture signal by dividing a single picture of digital picture data into a plurality of blocks and compressing said digital picture data block by block, comprising the steps of:
   (a) coding each of the plurality of blocks of the digital picture data;
   (b) detecting whether the individual blocks of the digital picture data lie in a predetermined range;
   (c) producing output data which includes the data coded at said step (a);
   (d) outputting data specifying the digital picture data in addition to the data coded at said step (a) depending on whether the digital picture data lies in said predetermined range;
   (e) applying two-dimensional orthogonal transform to the individual blocks of the digital picture data;
   (f) normalizing the data transformed at said step (e);
   (g) coding the data normalized at said step (f);
   (h) detecting whether an amplitude of the data normalized at said step (f) has exceeded said predetermined range; and
   (i) outputting the data specifying the data normalized at said step (f) in addition to the data coded at said step (g) when the amplitude of the normalized data exceeds said predetermined range.

15. A method for decoding a picture signal by expanding compression-coded digital picture data representative of a single picture inputted to a decoding device by two-dimensional inverse orthogonal transform, comprising the steps of:
   (a) decoding the compression-coded digital picture data into first and second data and a switch signal;
   (b) detecting whether the second data decoded at said step (a) has an amplitude exceeding a predetermined range and selecting decoded transform coefficients based on this detection;
   (c) selecting at least one of the first data decoded at said step (a) and the second data detected at said step (b) in response to said switch signal;
   (d) inversely normalizing the data selected at said step (c); and
   (e) applying two-dimensional inverse orthogonal transform to the data inversely normalized at said step (d).

16. A method for decoding a picture signal by expanding compression-coded digital picture data representative of a single picture inputted to a decoding device, comprising the steps of:
   (a) detecting whether the picture data includes a predetermined shift code;
   (b) decoding the picture data which includes said predetermined shift code when said step (a) detects the picture data to include said predetermined shift code; and
   (c) Huffman decoding the picture data when said predetermined shift code fails to be detected in the picture data at said step (a).

17. A method in accordance with claim 16, further comprising the steps of:
   (d) inversely normalizing the data decoded at said steps (b) and (c); and
   (e) applying two-dimensional inverse orthogonal transform to data produced by either one of said step (b) and said step (d).

* * * * *